US012441019B2

(12) United States Patent
Liao et al.

(10) Patent No.: US 12,441,019 B2
(45) Date of Patent: Oct. 14, 2025

(54) CUTTER DRIVING APPARATUS AND CUTTING DEVICE

(71) Applicant: CONTEMPORARY AMPEREX TECHNOLOGY (HONG KONG) LIMITED, Hong Kong (CN)

(72) Inventors: Ruhu Liao, Ningde (CN); Yitai Guo, Ningde (CN); Zhihua Wen, Ningde (CN); Yunru Shi, Ningde (CN); Cong Zhang, Ningde (CN); Yongli Zhang, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 386 days.

(21) Appl. No.: 17/954,036

(22) Filed: Sep. 27, 2022

(65) Prior Publication Data
US 2023/0241796 A1 Aug. 3, 2023

Related U.S. Application Data

(63) Continuation of application No. PCT/CN2022/093640, filed on May 18, 2022.

(30) Foreign Application Priority Data

Jan. 28, 2022 (CN) .......................... 202220238774.8

(51) Int. Cl.
*B26D 5/16* (2006.01)
*H01M 4/04* (2006.01)

(52) U.S. Cl.
CPC ................ *B26D 5/16* (2013.01); *H01M 4/04* (2013.01)

(58) Field of Classification Search
CPC ............... B26D 1/08; B26D 5/08; B26D 5/18
See application file for complete search history.

(56) References Cited

U.S. PATENT DOCUMENTS 4,583,437 A 4/1986 Rader et al.

FOREIGN PATENT DOCUMENTS

| CN | 204844247 U | * 12/2015 |
|---|---|---|
| CN | 205056773 U | 3/2016 |
| CN | 207111869 U | 3/2018 |
| CN | 110000273 A | 7/2019 |
| CN | 110614309 A | 12/2019 |
| CN | 111430739 A | 7/2020 |
| CN | 211661180 U | * 10/2020 |
| CN | 112475412 A | 3/2021 |
| CN | 112744574 A | 5/2021 |
| EP | 3131139 A1 | 2/2017 |

(Continued)

OTHER PUBLICATIONS

Japan Patent Office (JPO) The Decision to Grant a Patent for JP Application No. 2022-551321 Jul. 2, 2024 5 Pages (Translation Included).

(Continued)

*Primary Examiner* — Liang Dong
(74) *Attorney, Agent, or Firm* — ANOVA LAW GROUP, PLLC

(57) ABSTRACT

A cutter driving apparatus configured to drive a cutter of a cutting device includes a following drive assembly, a cutting drive assembly, a cutter drive rod connected to the following drive assembly, and a connecting rod assembly having a first connecting end connected to the cutting drive assembly and a second connecting end connected to the cutter drive rod.

18 Claims, 3 Drawing Sheets

(56) References Cited

FOREIGN PATENT DOCUMENTS

| | | |
|---|---|---|
| JP | S6017269 A | 1/1985 |
| JP | S6017299 A | 1/1985 |
| JP | S60172699 U | 11/1985 |
| KR | 20070112163 A | 11/2007 |
| KR | 20100019110 A | 2/2010 |
| KR | 20110088892 A | 8/2011 |
| KR | 20150103904 A | 9/2015 |
| WO | 2021129659 A1 | 7/2021 |

OTHER PUBLICATIONS

Korean Intellectual Property Office (KIPO) The Request for the Submission of an Opinion for KR Application No. 9-5-2024-074930645 Sep. 3, 2024 10 Pages (Translation Included ).

The World Intellectual Property Organization (WIPO) International Search Report and Written Opinion for PCT/CN2022/093640 Oct. 27, 2022 14 Pages (including translation).

The European Patent Office (EPO) The Extended European Search Report for Application No. 22765733.5, Feb. 21, 2024 6 Pages.

State Intellectual Property Office of China Notice of Grant of Invention Patent Right for Application No. 202220238774.8, May 18, 2022 2 pages (including translation).

The Japan Patent Office (JPO) Notification of Reasons for Refusal for Application No. 2022-551321 and Translation Feb. 14, 2024 6 Pages.

Korean Intellectual Property Office (KIPO) Office Action 1 for Application No. 10-2022-7028380 Feb. 19, 2024 8 Pages (including translation).

Korean Intellectual Property Office (KIPO) Written Decision on Registration for Application No. 10-2022-7028380 Nov. 25, 2024 8 Pages (including translation).

\* cited by examiner

CUTTER DRIVING APPARATUS AND CUTTING DEVICE

CROSS-REFERENCE TO RELATED APPLICATION

The present disclosure is a continuation of International Application No. PCT/CN2022/093640, filed on May 18, 2022, which claims priority to Chinese Patent Application No. 2022202387748 filed on Jan. 28, 2022, and entitled "Cutter Driving Apparatus and Cutting Device", the entire contents of both of which are incorporated herein by reference.

TECHNICAL FIELD

The present disclosure relates to the technical field of lithium battery manufacturing, and in particular, to a cutter driving apparatus and a cutting device.

BACKGROUND ART

After the electrode sheet of the lithium-ion battery is coated with slurry, dried and rolled, a three-layer composite structure with the current collector and two-sided coating is formed, and then the electrode sheet is cut according to the designed structure and specification of the battery. Generally, as for a wound battery, the electrode sheet is slit according to the designed width; and as for a laminated battery, the electrode sheet is cut into pieces accordingly.

At present, the electrode sheet cutting apparatus is also designed as a follow-cutting mechanism due to the high efficiency requirements for cutting the battery electrode sheet, that is, the cutter in the electrode sheet cutting apparatus is enabled to move to follow the material feeding direction of the material strip under the situation without reducing the material feeding speed of the electrode sheet material strip, and the material strip is cut at the same or similar speed as the material feeding speed of the material strip, thereby improving the cutting efficiency. However, in the above-mentioned follow-cut process, due to the relative movement between the various mechanisms, an acting force, such as frictional force, will be generated between the contact surfaces.

SUMMARY

The purpose of the present disclosure is to provide a cutter driving apparatus and a cutting device, which can solve the problem of battery safety hazards caused by falling metal particles during the cutting driving of the follow-cutting structure.

First aspect, the present disclosure provides a cutter driving apparatus, configured to drive a cutter of a cutting device to cut a material strip, which comprises a following drive assembly, a cutting drive assembly, a cutter drive rod, and a connecting rod assembly, wherein the cutter drive rod is connected to the following drive assembly; and the connecting rod assembly has a first connecting end connected to the cutting drive assembly, and a second connecting end connected to the cutter drive rod.

In the technical solution of the embodiments of the present disclosure, a connecting rod assembly is arranged, the first connecting end thereof is connected to the cutter drive rod, and the second connecting end thereof is connected to the cutting drive assembly, such that the vertical reciprocating driving of the cutting drive assembly is transmitted to the cutter drive rod by the connecting rod assembly, which replaces the physical structure of sliding rail and sliding block in the existing technologies. Since the connecting rod assembly cannot be rotated in a vertical direction, the driving force of the cutting drive assembly can be transmitted to the cutter drive rod, and since there is no contact surface between the sliding rail and the sliding block, the possibility of metal particles being generated due to the interaction force between the two during cutting is also avoided, which reduces the safety hazards of the battery.

In some embodiments, the connecting rod assembly comprises a first connecting rod and a second connecting rod, wherein the first connecting rod has the first connecting end and a first hinge end, and the second connecting rod has the second connecting end and a second hinge end, wherein the first hinge end is hinged to the second hinge end.

By making the first connecting rod and the second connecting rod hinged to form the connecting rod assembly, and by using the characteristic that the distance of the first connecting end of the first connecting rod and the second connecting end of the second connecting rod is adjustable due to rotation, the horizontal reciprocating movement of the cutter is realized when follow-cutting the material strip.

In some embodiments, the first connecting end is rotatably connected to the cutting drive assembly, and the second connecting end is rotatably connected to the cutter drive rod.

By providing the connection method between the first connecting end and the cutting drive assembly, and between the second connecting end and the cutter drive rod as a rotational connection to cooperate with the hinged connection between the first connecting rod and the second connecting rod, the cutter may have reciprocating movement in a horizontal direction when the cutter follow-cuts the material strip. The above-mentioned rotational connection method of the connecting rod assembly is used to replace the existing sliding connection method between the sliding rail and the sliding block, which avoids the risk of generating metal particles due to friction between the sliding rail and the sliding block.

In some embodiments, the first connecting rod and the second connecting rod are both perpendicular to an axial line of the cutter drive rod, and the first connecting rod is located above the second connecting rod, and a rotational plane of the rotational connection and a hinged connection is perpendicular to the axial line of the cutter drive rod.

By limiting the movement plane of the first connecting rod and the second connecting rod, the first connecting end and the second connecting end can be enabled to only produce a displacement in a horizontal direction, and cannot produce vertical displacement, which improves the transmission efficiency of driving force. Simultaneously, the first connecting rod and the second connecting rod respectively have different movement planes, so that the two will not interfere with each other, thereby increasing the rotation adjustment range thereof.

In some embodiments, the first hinge end and the second hinge end are hinged to each other by a connecting bolt, and the first connecting end and the second connecting end are respectively rotatably connected to the cutting drive assembly and the cutter drive rod by equal-height bolts.

By providing the connecting bolt and the equal-height bolt, a specific rotating connection structure is provided, and the above-mentioned structure is simple, convenient to install, and high stability.

In some embodiments, the cutting drive assembly comprises a cutting drive motor and a cam follow-up structure, and the cam follow-up structure is installed at a rotating shaft of the cutting drive motor and connected to the first connecting end.

By providing the cutting drive motor and the cam follow-up structure, an achievable vertical reciprocating drive structure is provided.

In some embodiments, the cam follow-up structure comprises a cam, a cam follow-up block and a sliding rail, the sliding rail is connected to the cutting drive motor; the cam follow-up block is installed at the sliding rail to be capable of sliding vertically, and a guide groove is provided at the cam follow-up block; and the cam is installed at the rotating shaft of the cutting drive motor, and the bearing follower provided thereon is inserted in the guide groove.

By providing the cam follow-up structure to include the cam, the cam follow-up block and the sliding rail, the rotary driving of the cutting drive motor can be converted into a vertical reciprocating driving in a vertical direction, thereby realizing the cutting function.

In some embodiments, the following drive assembly comprises a rack and a following drive motor, the rack is arranged horizontally, and a gear meshing with the rack is sleeved on a rotating shaft of the following drive motor; and the cutter drive rod is connected to the following drive motor.

By providing the drive motor and the rack, an achievable horizontal reciprocating drive structure is provided, and due to the shape of the rack, the drive motor can also move vertically relative to the rack, thereby solving the problem of vertical relative displacement that occurs when the following drive assembly and the cutting drive assembly are used in combination.

In some embodiments, the cutter drive rod has an upper end connected to the second connecting end of the connecting rod assembly, and a lower end connected to the following drive motor.

By connecting the lower end of the cutter drive rod with the drive motor, the influence of the cutter drive rod on the cutter due to the vertical drive transmission direction being offset can be reduced, so that the direction of the driving force transmitted to the cutter is vertical.

In a second aspect, the present disclosure provides a cutting device, which comprises the cutter driving apparatus in the above embodiments.

The above description is only an overview of the technical solution of the present disclosure, in order to be able to understand the technical means of the present disclosure more clearly, so as to be able to implement according to the content of the specification, and in order to make the above and other purposes, features and advantages of the present disclosure more obvious and easier to understand, and the specific embodiments of the present disclosure are specifically listed below.

BRIEF DESCRIPTION OF DRAWINGS

Various other advantages and benefits will become apparent to those ordinarily skilled in the art upon reading the following detailed description of some embodiments. The drawings are only for purpose of illustrating some embodiments and are not to be considered as limitations of the present disclosure. Besides, the same components are denoted by the same reference numerals throughout the drawings. In the drawings.

REFERENCE SIGNS IN THE DRAWINGS

Figure 1:
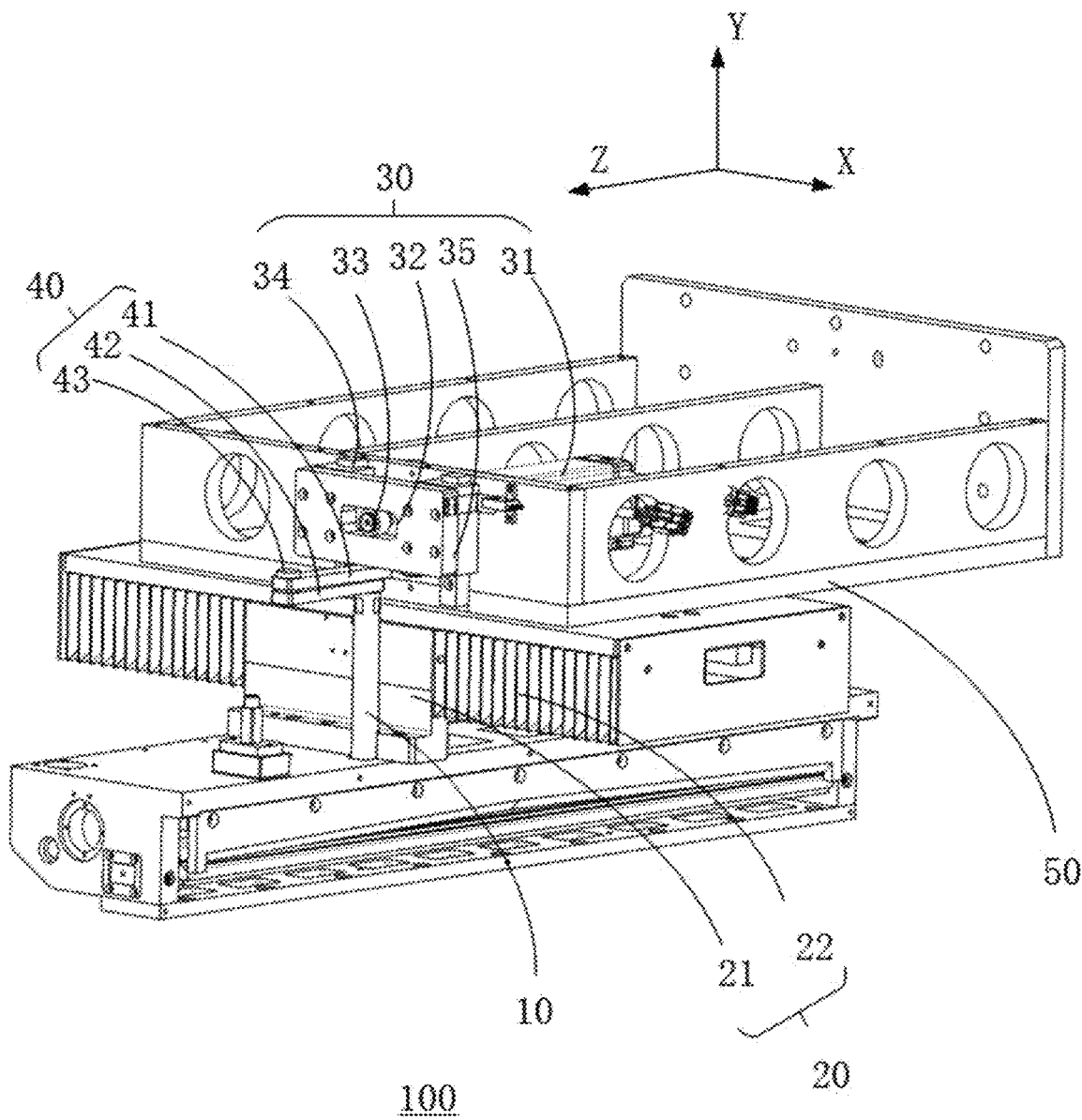
FIG. 1 is a structural schematic view of a cutter driving apparatus in some embodiments of the present disclosure.

100—cutter driving apparatus;
10—cutter drive rod;
20—following drive assembly, 21—following drive motor, 22—rack;
31—cutting drive motor, 32—cam, 33—bearing follower, 34—linear sliding rail, 35—cam follow-up block, 36—guide groove;
40—connecting rod assembly, 41—first connecting rod, 42—second connecting rod, 43—connecting bolt; and
50—machine base.

DETAILED DESCRIPTION OF EMBODIMENTS

The embodiments of the technical solutions of the present disclosure will be described in detail below in conjunction with the drawings. The following embodiments are only used to illustrate the technical solutions of the present disclosure more clearly, and are therefore only used as examples, and cannot be used to limit the protection scope of the present disclosure.

Unless otherwise defined, all technical and scientific terms used herein have the same meaning as those commonly understood by those skilled in the technical field of the present disclosure; the terms used herein are only for the purpose of describing specific embodiments, and is not intended to limit the present disclosure; the terms "comprising" and "having" and any variations thereof in the specification and claims of the present disclosure and the above description of the drawings are intended to cover non-exclusive inclusions.

In the description of the embodiments of the present disclosure, the technical terms "first", "second", etc. are only used to distinguish different objects, and should not be interpreted as indicating or implying importance in relativity or implicitly indicating the quantity, specific order or primary and secondary relationship of the indicated technical features. In the description of the embodiments of the present disclosure, "plurality" means two or more, unless otherwise expressly and specifically defined.

Reference herein to an "embodiment" means that a particular feature, structure, or characteristic described in connection with the embodiment can be included in at least one embodiment of the present disclosure. The appearances of the phrase in various places of the specification are not necessarily all referring to the same embodiment, nor a separate or alternative embodiment that is mutually exclusive with other embodiments. It is explicitly and implicitly understood by those skilled in the art that the embodiments described herein may be combined with other embodiments.

In the description of the embodiments of the present disclosure, the term "and/or" is only an association relationship for describing associated objects, indicating that there may be three types of relationships, such as A and/or B, which may indicate that there are three cases where A exists alone, A and B exist at the same time, and B exists alone. In addition, the character "/" herein generally indicates that the context associated objects have an "or" relationship.

In the description of the embodiments of the present disclosure, the term "multiple" refers to two or more than two, and similarly, "multiple groups" refers to two or more than two groups, and "multiple sheets" means two or more sheets (including two sheets).

In the description of the embodiments of the present disclosure, orientation or positional relations indicated by technical terms such as "center", "longitudinal", "horizontal", "length", "width", "thickness", "upper", "lower", "front", "rear", "left", "right", "vertical", "horizontal", "top", "bottom", "inside", "outside", "clockwise", "counter-clockwise", "axial", "radial", and "circumferential" are based on orientation or positional relations as shown in the drawings, merely for facilitating the description of the embodiments of the present disclosure and simplifying the description, rather than indicating or implying that related devices or elements have to be in the specific orientation, or configured or operated in a specific orientation, therefore, they should not be construed as limitations on the embodiments of the present disclosure.

In the description of the embodiments of the present disclosure, unless otherwise definitely specified and limited, technical terms "mount", "link", "connect" and "fix" should be understood in a broad sense, for example, they can be fixed connection, detachable connection or integrated connection; they can be mechanical connection or electrical connection; they can be directly attached or indirectly attached by intermediate medium. Connection can be the internal communication between two components or the interactive relationship between two components. For those ordinarily skilled in the art, the specific meaning of the above terms in the embodiments of the present disclosure can be understood according to the specific situation.

At present, in the electrode sheet cutting process, it is needed to stop or reduce the speed of the material strip when cutting, so as to ensure the cutting precision, resulting in the reduction of cutting efficiency. In order to improve the cutting efficiency for the battery electrode sheet, without reducing the material feeding speed of the electrode sheet material strip, the cutter in the electrode sheet cutting apparatus is enabled to follow the material feeding direction of the material strip to move, and the material strip is cut at the same or similar speed as the material feeding speed of the material strip. The above-mentioned cutting method is also called follow-cutting, and the electrode sheet cutting device is called an electrode sheet follow-cutting device. However, the existing cutting device has the following disadvantages.

During the cutting process, the following drive assembly for providing horizontal reciprocating driving and the cutting drive assembly for providing vertical reciprocating driving are needed to act on the cutter drive rod 10 at the same time, so that it can drive the cutter to follow-cut the material strip. In order to realize the combination of vertical reciprocating driving and horizontal reciprocating driving, it is generally needed to provide a multi-stage sliding structure, and the transmission of the driving force is realized by the relative sliding of the sliding block and the sliding rail in the sliding structure. However, since most of the sliding structures are made of metal materials, the relative sliding will inevitably cause wear during the sliding process, and then a certain amount of metal particles will be generated, the metal particles falling on the electrode sheet will directly contaminate the electrode sheet, resulting in an internal short circuit in the battery, causing self-discharge or even thermal runaway, thereby resulting in safety hazards for the battery.

Figure 2:
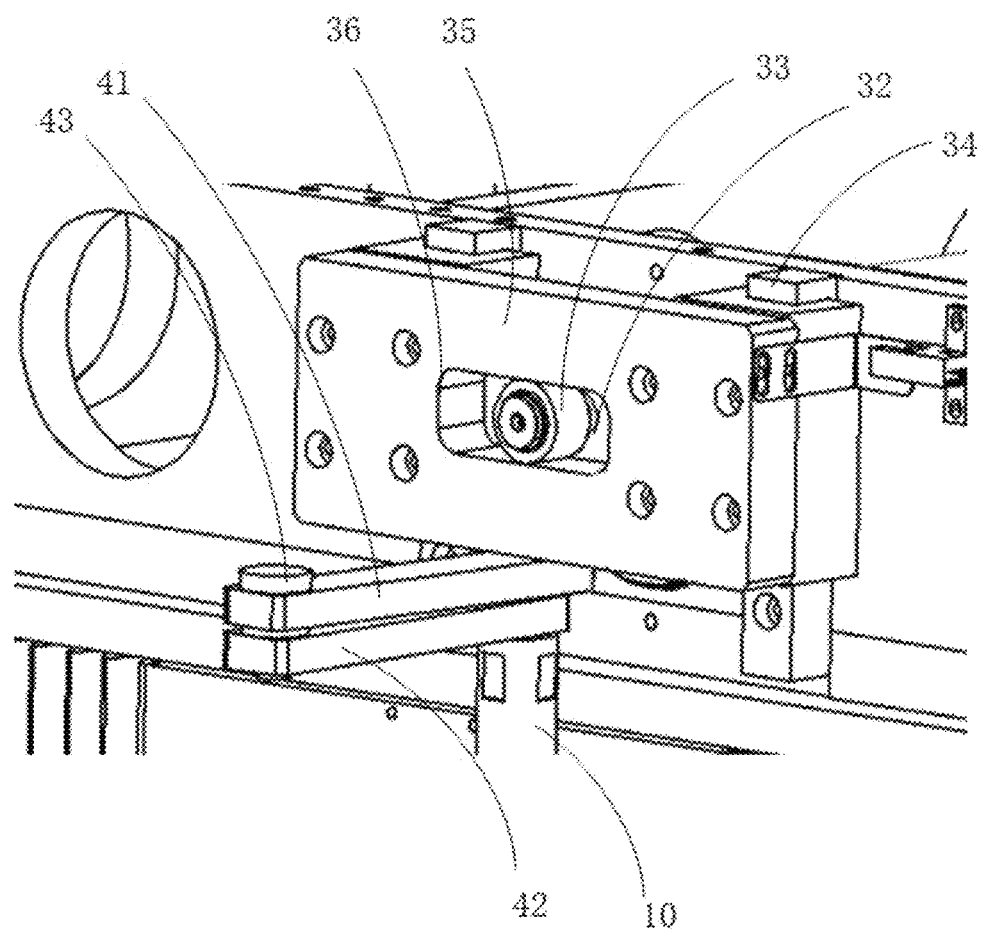
FIG. 2 is a structural enlarged view of a position of a connecting rod assembly in some embodiments of the present disclosure.
Figure 3:
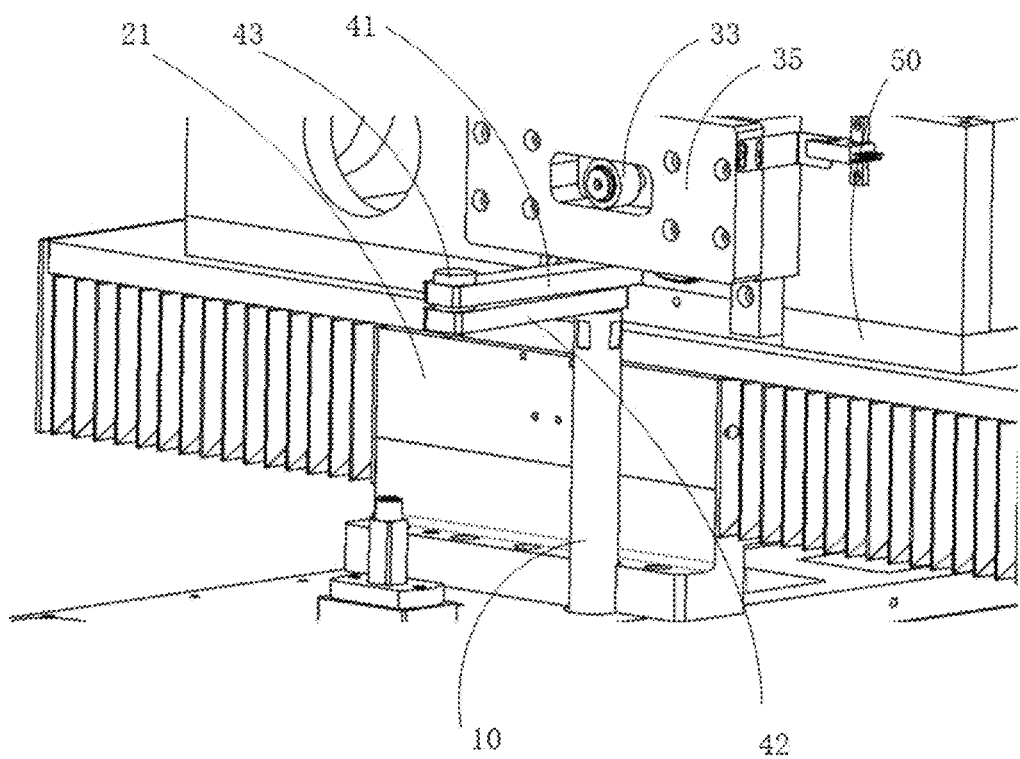
FIG. 3 is a structural enlarged view of a position of a cutter drive rod in some embodiments of the present disclosure.

In order to solve the above problems, as shown in FIG. 1-FIG. 3, an embodiment of the present disclosure proposes a cutter driving apparatus 100 for driving the cutter to follow-cut the material strip, specifically, the driving apparatus includes a following drive assembly, a cutting drive assembly, a cutter drive rod and a connecting rod assembly 40, wherein the cutter drive rod is connected to the following drive assembly; and the first connecting end of the connecting rod assembly 40 is connected to the cutting drive assembly, and the second connecting end is connected to the cutter drive rod.

For the convenience of description, in the present embodiment, a direction parallel to an advancing direction of the material strip is taken as the horizontal direction, that is, X direction shown in the drawings, a direction perpendicular to the advancing direction of the material strip is taken as the vertical direction, that is, Y direction shown in the drawings. In the present embodiment, the following drive assembly is suitable for horizontal reciprocating driving, and driving direction thereof is parallel to the advancing direction of the material strip, which is suitable for providing a driving force in a direction consistent with the advancing direction of the material strip during the follow-cutting process, so that the cutter follows the material strip to advance synchronously, and providing a driving force in a direction opposite to the advancing direction of the material strip after the follow-cutting process is completed, so as to drive the cutter to recover its original position. The cutting drive assembly is suitable for vertical reciprocating driving, and driving direction thereof is perpendicular to the advancing direction of the material strip, which is suitable for providing a driving force towards the material strip during the follow-cutting process, so that the cutter cuts off the material strip, and providing a driving force in the opposite direction after the follow-cutting process is completed, so as to drive the cutter to recover its original position. The direction of the above-mentioned driving force is relative to the advancing direction of the material strip, and is adjusted according to the advancing direction of the material strip in specific applications.

The cutter drive rod is rod-shaped, and axis direction thereof is the Y direction in the drawings, and lower end thereof is used to install the cutter, so as to drive the cutter to follow-cut the material strip, therefore, it needs to have the ability of horizontal reciprocating movement and vertical reciprocating movement at the same time, specifically, the cutter drive rod is installed at the following drive assembly, so that it can obtain the horizontal reciprocating driving of the following drive assembly.

The connecting rod assembly 40 is in a rotating connection structure, and rotational plane thereof is perpendicular to the axis direction of the cutter drive rod, the first connecting end is connected to the cutting drive assembly, and the second connecting end is connected to the cutter drive rod, which can transmit the vertical reciprocating driving of the cutting drive assembly to the cutter drive rod, so that the cutter drive rod has the vertical reciprocating driving. The axial direction, the vertical direction, and the Y direction of the above-mentioned cutter drive rod represent the same direction.

The connecting rod assembly 40 is arranged, the first connecting end is enabled to be connected to the cutter drive rod, and the second connecting end is enabled to be connected to the cutting drive assembly, such that the connecting rod assembly 40 is used to transmit the vertical reciprocating driving of the cutting drive assembly to the cutter drive rod, which replaces the physical structure of the sliding rail and the sliding block in the existing technologies. Since the connecting rod assembly 40 is not rotatable in a vertical direction, the driving force of the cutting drive assembly can be transmitted to the cutter drive rod, and since there is no contact surface between the sliding rail and the sliding block, the possibility of metal particles being generated due to the interaction force between the two during cutting is also avoided, which reduces the safety hazards of the battery.

According to some embodiments of the present disclosure, the connecting rod assembly 40 includes a first connecting rod 41 and a second connecting rod 42, the first connecting rod 41 has a first connecting end and a first hinge end, and the second connecting rod 42 has a second connecting end and a second hinge end, and the first hinge end and the second hinge end are hinged to each other.

The two ends of the first connecting rod 41 are respectively the first connecting end and the first hinge end, and the two ends of the second connecting rod 42 are respectively the second connecting end and the second hinge end, by hinging the first hinge end to the second hinge end, the first connecting rod 41 and the second connecting rod 42 are enabled to constitute the connecting rod assembly 40, and when the first connecting rod 41 and the second connecting rod 42 rotate relative to each other, the distance between the first connecting end and the second connecting end can be adjusted, and the first connecting end is connected to the cutting drive assembly, and the second connecting end is connected to the cutter drive rod, that is, the positional relationship between the cutter drive rod and the cutting drive assembly on the horizontal plane is adjustable, and the horizontal plane is the X-Z plane in the figure.

By making the first connecting rod 41 and the second connecting rod 42 hinged to form the connecting rod assembly 40, and by using the characteristic that the distance between the first connecting end and the second connecting end of the first connecting rod 41 and the second connecting rod 42 can be adjusted due to rotation, the horizontal reciprocating movement of the cutter is realized when follow-cutting the material strip.

According to some embodiments of the present disclosure, the first connecting end is rotatably connected to the cutting drive assembly, and the second connecting end is rotatably connected to the cutter drive rod.

By providing the connection method between the first connecting end and the cutting drive assembly, and between the second connecting end and the cutter drive rod as a rotational connection to cooperate with the hinged connection between the first connecting rod and the second connecting rod, the cutter may have reciprocating movement in a horizontal direction when the cutter follow-cuts the material strip. The above-mentioned rotational connection method of the connecting rod assembly is used to replace the existing sliding connection method between the sliding rail and the sliding block, which avoids the risk of generating metal particles due to friction between the sliding rail and the sliding block.

According to some embodiments of the present disclosure, the first connecting rod 41 and the second connecting rod 42 are both perpendicular to an axial line of the cutter drive rod, and the first connecting rod 41 is located above the second connecting rod 42, and a rotational plane of the rotational connection and a hinged connection is perpendicular to the axial line of the cutter drive rod.

By limiting the movement plane of the first connecting rod 41 and the second connecting rod 42, the first connecting end and the second connecting end can be enabled to only produce a displacement in a horizontal direction, and cannot produce vertical displacement, which improves the transmission efficiency of driving force. Simultaneously, the first connecting rod 41 and the second connecting rod 42 respectively have different movement planes, so that the two will not interfere with each other, thereby increasing the rotation adjustment range thereof, so that the first connecting rod 41 and the second connecting rod 42 with smaller length can realize a wider range of rotation adjustment, so as to optimize the structure size, and the second connecting end can realize adjusting the distance from the first connecting end through the rotating connection, thereby realizing the reciprocating movement of the cutter in the horizontal direction, and the maximum distance range of the reciprocating movement of the cutter in the horizontal direction is twice the sum of the length of the first connecting rod and the length of the second connecting rod.

According to some embodiments of the present disclosure, the first hinge end and the second hinge end are hinged to each other by the connecting bolt 43, and the first connecting end and the second connecting end are respectively rotatably connected to the cutting drive assembly and the cutter drive rod by equal-height bolts.

In the first connecting rod 41, the first hinge end and the first connecting end are both provided with vertical mounting holes, and in the second connecting rod 42, the second hinge end and the second connecting end are also both provided with vertical mounting holes, and vertical mounting holes are also provided at the upper surface of the cutter drive rod and the lower surface of the cutting drive assembly. In the above, the mounting holes of the first hinge end and the second hinge end are connected in a manner of insertion through the vertically arranged connecting bolt 43, the mounting holes of the first connecting end and the cutting drive assembly are connected by the equal-height bolt, and the mounting holes of the second connecting end and the cutter drive rod are also connected by the equal-height bolt. Those skilled in the art will understand that the cutting drive assembly, the first connecting rod, the second connecting rod, and the cutter drive rod may also be connected by other rotational connection methods, which are not limited herein.

By providing the connecting bolt 43 and the equal-height bolt, a specific rotating connection structure is provided, and the above-mentioned structure is simple, convenient to install, and high in stability.

According to some embodiments of the present disclosure, the cutting drive assembly comprises a cutting drive motor 31 and a cam follow-up structure, and the cam follow-up structure is installed at a rotating shaft of the cutting drive motor 31 and connected to the first connecting end. By providing the cutting drive motor 31 and the cam follow-up structure, an achievable vertical reciprocating drive structure is provided.

According to some embodiments of the present disclosure, the cam follow-up structure comprises a cam 32, a cam follow-up block 35 and a linear sliding rail 34; the cam follow-up block 35 is installed at the linear sliding rail 34 to be capable of sliding vertically, and a guide groove 36 is provided at the cam follow-up block 35; and the cam 32 is installed at the rotating shaft of the cutting drive motor 31, and the bearing follower 33 provided thereon is inserted in the guide groove 36.

The rotating shaft of the cutting drive motor 31 drives the cam to rotate, and then makes the bearing follower 33 rotate synchronously, because the bearing follower 33 is installed in the guide groove 36, and can perform horizontal reciprocating movement in the guide groove 36, so that the rotated bearing follower 33 can perform horizontal reciprocating movement in the guide groove 36, and simultaneously can also drive the cam follow-up block 35 to perform vertical reciprocating movement on the linear sliding rail 34 through the cooperation with the guide groove 36, so as to convert the rotary driving of the cutting drive motor 31 to a vertical reciprocating driving, and because the cam follow-up block 35 is connected to the connecting rod assembly 40, specifically with the first connecting end of the first connecting rod 41 in the connecting rod assembly 40, therefore, the vertical reciprocating driving can be transmitted to the connecting rod assembly 40 and transmitted to the cutter drive rod through the connecting rod assembly 40.

By providing the cam follow-up structure to include the cam 32, the cam follow-up block 35 and the linear sliding rail 34, the rotary driving of the cutting drive motor 31 can be converted into a vertical reciprocating driving in a vertical direction, thereby realizing the cutting function.

According to some embodiments of the present disclosure, the following drive assembly 20 comprises a rack 22 and a following drive motor 21, the rack 22 is arranged horizontally, and a gear meshing with the rack 22 is sleeved on a rotating shaft of the following drive motor 21; and the cutter drive rod is connected to the following drive motor 21.

The following drive motor 21 travels on the rack 22 due to the meshing transmission of the gear and the rack 22, thereby realizing the horizontal reciprocating driving, and because the teeth of the rack 22 are vertically provided, so that the following drive motor 21 can also move vertically thereon, thereby being compatible with the vertical driving of the cutting drive assembly.

By providing the following drive motor 21 and the rack 22, an achievable horizontal reciprocating drive structure is provided, and due to the shape of the rack 22, the above-mentioned following drive motor 21 can also be enabled to move vertically relative to the rack 22, thereby solving the problem of vertical relative displacement that occurs when the following drive assembly and the cutting drive assembly are used in combination.

According to some embodiments of the present disclosure, the cutter drive rod has an upper end connected to the second connecting end of the connecting rod assembly 40, and a lower end connected to the following drive motor 21.

The upper end of the cutter drive rod is rotatably connected to the second connecting end of the connecting rod assembly 40, and the lower end is fixedly connected to the following drive motor 21, so that the cutter drive rod can transmit the vertical reciprocating driving transmitted from the connecting rod assembly 40 to the following drive motor 21, and then the drive motor 21 drives the cutter drive rod to move vertically. Through the above-mentioned structure, the problem that the transmission direction of the vertical reciprocating driving is offset due to the fact that the first connecting end and the second connecting end of the connecting rod assembly are not on the same vertical line can be solved by using the limiting action of the rack 22 and the following drive motor 21, and the lower end of the cutter drive rod is enabled to be kept in a vertical state, so that the direction of the driving force transmitted to the cutter is the vertical direction.

By connecting the lower end of the cutter drive rod with the following drive motor 21, the influence of the cutter drive rod on the cutter due to the vertical drive transmission direction being offset can be reduced, so that the direction of the driving force transmitted to the cutter is vertical direction.

According to some embodiments of the present disclosure, optionally, a machine base 50 is also included, and the cutting drive motor 31, the rack 22 and the linear sliding rail 34 are mounted on the machine base 50. The machine base 50 at least includes a horizontally arranged bottom plate and a vertical plate perpendicular to the bottom plate and parallel to the advancing direction of the material strip, wherein the cutting drive motor 31 with the rotating shaft facing the vertical plate is installed at the upper surface of the bottom plate, and rotating shaft thereof is enabled to pass through the vertical plate, the rack 22 is installed at the lower surface, and the linear sliding rail 34 is installed at the vertical plate, wherein two linear sliding rails 34 are provided, and respectively provided at two sides of the cutting drive motor 31, which are suitable for vertically slidably installing the cam follow-up block 35, and a cavity suitable for accommodating the cam 32 is formed between the cam follow-up block 35 and the vertical plate.

The machine base 50 is arranged, and the cutting drive motor 31, the rack 22 and the linear guide rail are installed at the machine base 50, such that the spatial layout of the cutting drive motor 31, the rack 22 and the linear guide rail are optimized, so that the overall structure is more reasonable and compact. According to some embodiments of the present disclosure, the present disclosure further provides a cutting device, which includes the cutter driving apparatus 100 in any one of the above solutions.

Finally, it should be noted that: the above embodiments are only used to illustrate the technical solution of the present disclosure, not to limit it; although the present disclosure has been described in detail with reference to the above-mentioned embodiments, those ordinarily skilled in the art should understand that they can still modify the technical solution recorded in the above-mentioned embodiments, or equivalently replace some or all of the technical features therein; and these modifications or substitutions do not make the essence of the corresponding technical solutions out of the scope of the technical solutions of the embodiments of the present disclosure.

What is claimed is:

1. A cutter driving apparatus, configured to drive a cutter of a cutting device, comprising:
    a following drive assembly comprising a following drive motor;
    a cutting drive assembly;
    a cutter drive rod, wherein an end of the cutter drive rod is directly connected to the following drive motor; and
    a connecting rod assembly, wherein the connecting rod assembly has a first connecting end connected to the cutting drive assembly, and a second connecting end connected to the cutter drive rod.

2. The cutter driving apparatus according to claim 1, wherein the connecting rod assembly comprises a first connecting rod and a second connecting rod, the first connecting rod has the first connecting end and a first hinge end, and the second connecting rod has the second connecting end and a second hinge end, and the first hinge end is hinged to the second hinge end.

3. The cutter driving apparatus according to claim 2, wherein the first connecting end is rotatably connected to the cutting drive assembly, and the second connecting end is rotatably connected to the cutter drive rod.

4. The cutter driving apparatus according to claim 3, wherein:
    the first connecting rod and the second connecting rod are both perpendicular to an axial line of the cutter drive rod, and the first connecting rod is located above the second connecting rod; and a rotational plane of a rotational connection between the first connecting end and the cutting drive assembly, a rotation plane of a rotational connection between the second connecting end and the cutter drive rod, and a rotational plane of a hinged connection between the first hinge end and the second hinge end are perpendicular to the axial line of the cutter drive rod.

5. The cutter driving apparatus according to claim 3, wherein the first hinge end and the second hinge end are hinged to each other by a connecting bolt.

6. The cutter driving apparatus according to claim 1, wherein the cutting drive assembly comprises a cutting drive motor and a cam follow-up structure, and the cam follow-up structure is installed at a rotating shaft of the cutting drive motor and connected to the first connecting end.

7. The cutter driving apparatus according to claim 6, wherein the cam follow-up structure comprises:
a sliding rail connected to the cutting drive motor;
a cam follow-up block installed at the sliding rail and configured to slide vertically, a guide groove being provided at the cam follow-up block; and
a cam installed at the rotating shaft of the cutting drive motor, a bearing follower provided at the cam being inserted in the guide groove.

8. The cutter driving apparatus according to claim 1, wherein the following drive assembly further comprises:
a rack arranged horizontally.

9. The cutter driving apparatus according to claim 1, wherein the end of the cutter drive rod is a first end, and the cutter drive rod has a second end connected to the second connecting end of the connecting rod assembly.

10. A cutting device, comprising:
a cutter configured to cut a material strip; and
the cutter driving apparatus according to claim 1, configured to drive the cutter.

11. The cutting device according to claim 10, wherein the connecting rod assembly comprises a first connecting rod and a second connecting rod, the first connecting rod has the first connecting end and a first hinge end, and the second connecting rod has the second connecting end and a second hinge end, and the first hinge end is hinged to the second hinge end.

12. The cutting device according to claim 11, wherein the first connecting end is rotatably connected to the cutting drive assembly, and the second connecting end is rotatably connected to the cutter drive rod.

13. The cutting device according to claim 12, wherein:
the first connecting rod and the second connecting rod are both perpendicular to an axial line of the cutter drive rod, and the first connecting rod is located above the second connecting rod; and a rotational plane of a rotational connection between the first connecting end and the cutting drive assembly, a rotation plane of a rotational connection between the second connecting end and the cutter drive rod, and a rotational plane of a hinged connection between the first hinge end and the second hinge end are perpendicular to the axial line of the cutter drive rod.

14. The cutting device according to claim 12, wherein the first hinge end and the second hinge end are hinged to each other by a connecting bolt.

15. The cutting device according to claim 10, wherein the cutting drive assembly comprises a cutting drive motor and a cam follow-up structure, and the cam follow-up structure is installed at a rotating shaft of the cutting drive motor and connected to the first connecting end.

16. The cutting device according to claim 15, wherein the cam follow-up structure comprises:
a sliding rail connected to the cutting drive motor;
a cam follow-up block installed at the sliding rail and configured to slide vertically, a guide groove being provided at the cam follow-up block; and
a cam installed at the rotating shaft of the cutting drive motor, a bearing follower provided at the cam being inserted in the guide groove.

17. The cutting device according to claim 10, wherein the following drive assembly further comprises:
a rack arranged horizontally.

18. The cutting device according to claim 10, wherein the end of the cutter drive rod is a first end, and the cutter drive rod has a second end connected to the second connecting end of the connecting rod assembly.

* * * * *